Dec. 5, 1939.  C. R. HALL  2,182,492
CONTAINER CLOSURE
Filed Jan. 30, 1937
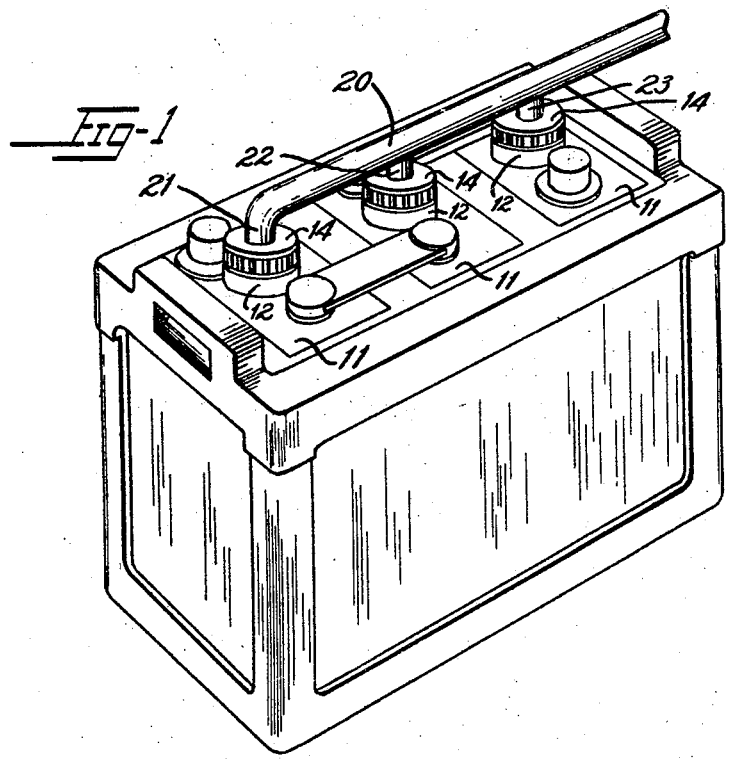
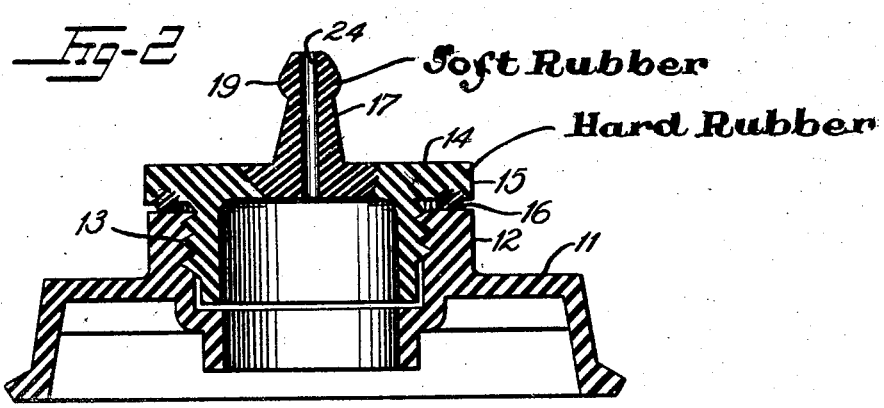
Inventor
Charles R. Hall
By Willis F. Avery
Atty Patented Dec. 5, 1939

2,182,492

UNITED STATES PATENT OFFICE 2,182,492

CONTAINER CLOSURE

Charles R. Hall, Akron, Ohio, assignor to The B. F. Goodrich Company, New York, N. Y., a corporation of New York Application January 30, 1937, Serial No. 123,221

4 Claims. (Cl. 136—177)

This invention relates to closures for containers, and especially caps for batteries.

Where storage batteries are installed near internal combustion engines it is desirable to provide for the venting of gas liberated from the battery away from the proximity of the engine and away from the occupants of the vehicle.

The principal objects of this invention are to provide safety and security in the venting of gas from a storage battery, to reduce the danger of breakage, and to provide simplicity of construction, and facility of manufacture.

These and other objects will appear from the following description and the accompanying drawing.

Of the drawing:

Fig. 1 is a perspective view of a storage battery, showing the invention in its preferred form as applied to a three cell battery.

Fig. 2 is a vertical cross-sectional view taken through the cell cover and filler plug of one of the cells.

Referring to the drawing, the numeral 10 designates the battery case or container which may be of molded construction and formed with integral partition walls which define a plurality of cells. A cell cover 11, preferably of molded, rigid material, such as hard rubber, is sealed in the mouth of each cell and is formed with a filling opening 12 provided with means, such as screw threads 13, for retaining a filling cap 14.

The cap 14 has a body of rigid material such as hard rubber or other moldable plastic material, and is formed with a flange 15 extending over the margin of the filling aperture, and has a resilient sealing gasket 16, preferably of soft, vulcanized rubber or similar material and preferably integral with the cap. Extending from the body of the cap 14, preferably at its center, is a tubular vent nipple 17, preferably molded integral with the body of the cap, of pliable material, such as soft rubber composition or other flexible material having the pertinent characteristics of soft vulcanized rubber such as flexibility, pliability, resilience, resistance to action of water and acids, and resistance to change of flexibility under extremes of temperature. The venting is effected by an aperture 24 extending through the nipple. The nipple is preferably formed with a bead 19 at its free end to assist in retaining a manifold 20 held frictionally upon the nipple to conduct away gases vented through the aperture of the cap. The manifold may be of any suitable material, preferably flexible elastic material such as soft rubber or similar composition.

The manifold or vent conduit 20 may be formed with a plurality of branches 21, 22, 23 whereby it may be connected to the vent nipples from a plurality of cells. With a flexible manifold, any one of the branches may be temporarily detached to permit temporary removal of a filler cap for inspection and filling purposes.

By providing the nipple 17 of pliable, flexible material and integral with the rigid cap, danger of breakage of the projecting nipples from the caps is reduced to a minimum. The elastic and flexible construction of the nipples permits unharmful distortion, and the likelihood of breakage and loosened connections from vibration is greatly lessened. The provision of the retaining beads on the nipples permits a tight engagement of the nipples with the manifold that is maintained by the resilience of the material. The integral construction of the rigid cap with the flexible nipple and the resilient gasket eliminates likelihood of leakage and this construction permits manufacture by a single molding operation in a simple mold as the plastic composition for forming the several parts may be assembled in a single mold cavity and homogeneously united during the molding process.

I claim

1. A closure member for a battery container, said member comprising a rigid body having means for securing it to the container, and a flexible tubular nipple integral with the body in venting communication with the container.

2. A closure member for a battery container, said member comprising a rigid body having means for securing it to the container, a resilient sealing gasket integral therewith for sealing the joint therebetween, and a flexible tubular nipple integral with the body in venting communication with the container.

3. A filler plug for use between a battery container and a flexible vent manifold, said plug comprising a rigid body having means for securing it to the container, a resilient sealing gasket integral therewith for sealing the joint therebetween, and a flexible tubular nipple integral with the body and communicating with the container, said nipple having means on its free end for engaging the said flexible vent manifold in sealing engagement.

4. Apparatus for conducting corrosive gases from a battery container, said apparatus comprising a filler plug constructed and arranged to removably engage a filler opening of the container in sealing engagement therewith, a flexible vent tube integral with said filler plug and extending therefrom in communication with the interior of the container, and a gas conducting tube having slip engagement with said flexible vent tube.

CHARLES R. HALL.